(12) United States Patent
Kobayashi et al.

(10) Patent No.: US 7,227,625 B2
(45) Date of Patent: Jun. 5, 2007

(54) METEOROLOGICAL OBSERVATION LIDAR SYSTEM

(75) Inventors: Takao Kobayashi, Fukui (JP); Toshikazu Hasegawa, Tokyo (JP); Dengxin Hua, Tokyo (JP); Kiyotaka Uchida, Tokyo (JP)

(73) Assignee: EKO Instruments Co., Ltd., Tokyo (JP)

(*) Notice: Subject to any disclaimer, the term of this patent is extended or adjusted under 35 U.S.C. 154(b) by 382 days.

(21) Appl. No.: 10/480,225

(22) PCT Filed: Feb. 20, 2003

(86) PCT No.: PCT/JP03/01876

§ 371 (c)(1),
(2), (4) Date: Jul. 15, 2004

(87) PCT Pub. No.: WO03/073127

PCT Pub. Date: Sep. 4, 2003

(65) Prior Publication Data

US 2004/0239913 A1    Dec. 2, 2004

(30) Foreign Application Priority Data

Feb. 21, 2002    (JP)    ............................ 2002-045382

(51) Int. Cl.
*G01N 21/17* (2006.01)
*G01N 21/65* (2006.01)

(52) U.S. Cl. .................. 356/73; 356/301; 356/419

(58) Field of Classification Search .................. 356/73, 356/301, 419

See application file for complete search history.

(56) References Cited

U.S. PATENT DOCUMENTS 5,250,810 A * 10/1993 Geiger .................... 250/338.5
5,487,669 A *  1/1996 Kelk  .......................... 434/112

FOREIGN PATENT DOCUMENTS

| JP | 48-48152 | 6/1973 | .................. 107/1 |
| JP | 51-6056 | 1/1976 | |
| JP | 51-98072 | 8/1976 | |
| JP | 11-264928 | 9/1999 | |
| WO | WO 94/11759 | 5/1994 | |

OTHER PUBLICATIONS

Patent Abstracts of Japan (English text of application) publication No. 11-264928, published Sep. 28, 1999; 15 pages.

* cited by examiner

*Primary Examiner*—F. L. Evans
(74) *Attorney, Agent, or Firm*—Osha Liang LLP

(57) ABSTRACT

A lidar system for meteorological observation, in which pulsed laser light having a prescribed central frequency is emitted from a laser device and reflected light thereof is observed, includes: a spectral analyzer for spectrally analyzing reflected light for observation into light in the wavelength region of the laser light and light in wavelength regions other than the region of the laser light; a first and a second filter for selectively passing light centered on a first and a second frequency component among the light of the wavelength region of the laser light, respectively; a first and a second photodetection unit configured to detect the first and second frequency component light passed through the first and second filter, respectively; and a third and a fourth photodetection unit configured to detect the light of the wavelength region of the laser light and regions other than the region of the laser light, respectively.

17 Claims, 11 Drawing Sheets

FIG.3
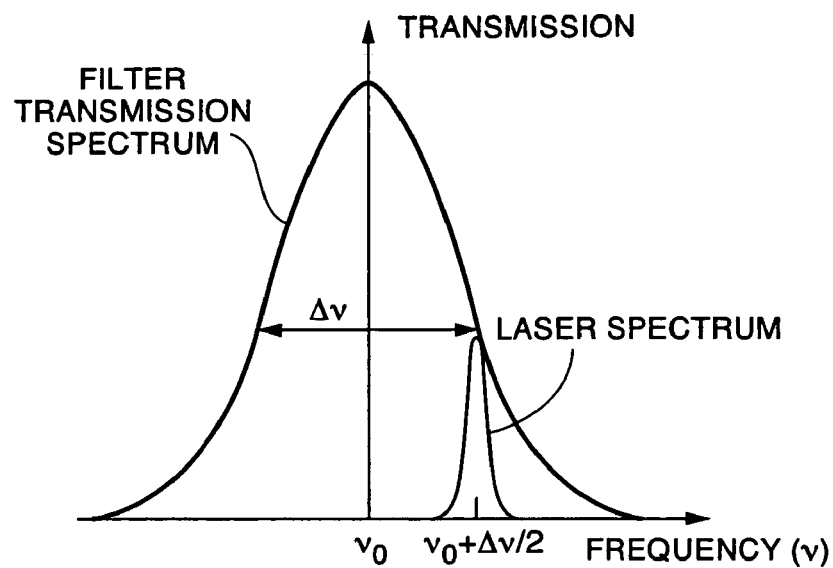
(a)
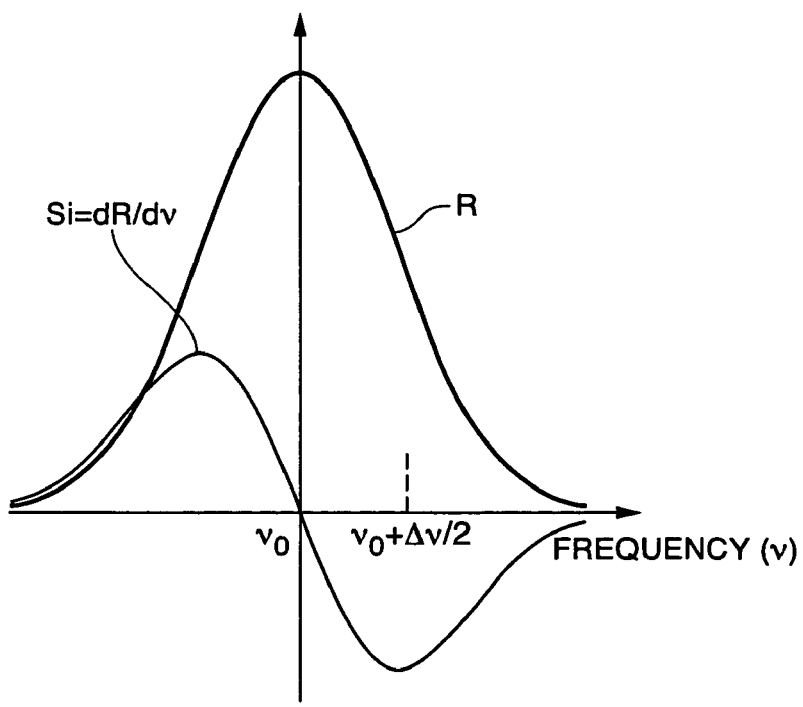
(b)

FIG.5
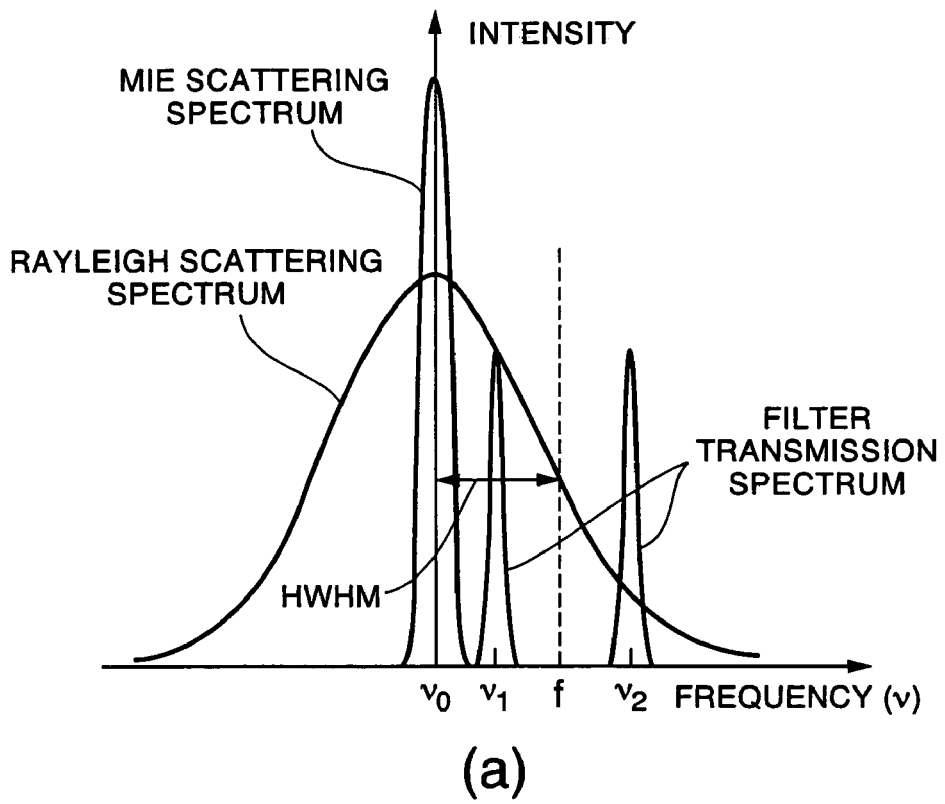
(a)
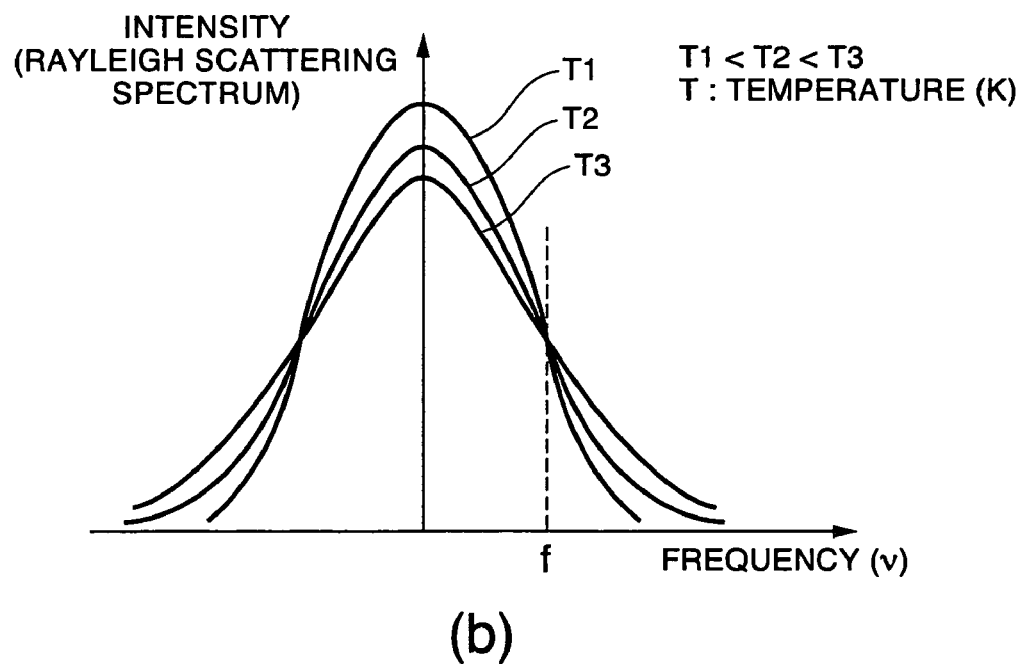
(b)

METEOROLOGICAL OBSERVATION LIDAR SYSTEM

TECHNICAL FIELD

The present invention relates to a meteorological observation system and to a meteorological observation method using same, and in particular to a meteorological observation system employing LIDAR (laser radar) (LIDAR system for meteorological observation), and to a meteorological observation method and LIDAR meteorological observation analysis method using same.

BACKGROUND ART

LIDAR (Light Detection and Ranging) is technology for observation of atmospheric states through the irradiation of an atmospheric region for observation with short-pulse laser light, and the measurement and analysis of the scattered light as a LIDAR signal. An Nd:YAG laser is generally used to emit the laser light for LIDAR observation. Types of scattering resulting from laser light irradiation include Mie scattering due to aerosols (suspended particles), Rayleigh scattering by component molecules of the atmosphere, and Raman scattering; these can be employed in analyses of the atmospheric temperature, spatial distribution of aerosols, atmospheric density, concentration distribution of atmospheric components, and other observed elements. In practice, such analyses are performed by solving equations, called LIDAR equations, which represent the LIDAR signals.

Mie scattering is a scattering phenomenon which is caused by substances of sizes approximately equal to the wavelength of the irradiated laser light. Rayleigh scattering is a scattering phenomenon caused by substances smaller than the wavelength of the irradiated laser light. Mie scattering signal components and Rayleigh scattering signal components are superposed in LIDAR signals from observation regions in which aerosols exist; in order to perform high-precision measurements using Rayleigh scattering LIDAR, Mie scattering signal components must be efficiently separated or blocked (spectrally analyzed). Techniques for spectral analysis of Mie scattering signal components generally employ iodine absorption filters as filters with high blocking rates. Spectral analysis techniques employing iodine absorption filters involve sweeping the single-frequency light wavelength so that the wavelength of the irradiated laser light matches a specific absorption spectra line of the iodine gas, then irradiating the atmosphere with the laser light, and guiding the LIDAR signal to the iodine absorption filter. By this means, the Mie scattering signal component contained in the LIDAR signal is absorbed by the iodine absorption filter, and only the Rayleigh scattering signal component is passed.

In addition, when a substance is irradiated with laser light, scattered light is observed at a wavelength different from that of the incident light. This is called Raman scattering. Raman scattering LIDAR is effective for observation of atmospheric temperatures and observation of water vapor distributions. For example, when analyzing atmospheric temperature, vibrational Raman scattering of nitrogen molecules and similar is used to determine atmospheric density, and analyses similar to that for Rayleigh scattering LIDAR is performed, or atmospheric temperature may be determined from the intensity distribution of rotational Raman scattering spectra. When analyzing water vapor distribution, vibrational Raman scattering by the water molecules constituting the water vapor and by the nitrogen molecules in the atmosphere is analyzed simultaneously, the rate of attenuation due to the atmospheric density is corrected, and the water vapor distribution is derived from the distribution of the average density of nitrogen molecules.

In order to perform high-precision observations using Rayleigh scattering LIDAR, the superposed Mie scattering signal component and Rayleigh scatting signal component must be analyzed efficiently. In the stratosphere at a height of 30 km or higher, the entire signal is due to Rayleigh scattering by molecules comprised by the atmosphere, and measurement is performed relatively simply; but in the troposphere, there exists intense Mie-scattered light due to aerosols, and the scattering intensity is not uniform. Thus, in order to perform LIDAR observation using Rayleigh scattering, for practical purposes, a Mie scattering signal component blocking rate extending to several decimal places is required.

On the other hand, when using spectral analysis techniques employing an iodine absorption filter, there may be the problem that the transmission characteristics of such absorption filters are unstable. This may arise mainly because the density distribution of the iodine gas in the absorption filter is not uniform, so that there may be instability in the absorption spectra characteristics.

In order to increase the finesse, which is a measure of the spectral resolution, of such a high blocking-rate filter, the filter is coated with a dielectric multilayer film with high reflectivity. However, if the reflectivity is increased through such a coating, the maximum transmittance of the filter is lowered, resulting in a critical drawback for the purpose of LIDAR observations entailing measurements of weak LIDAR signals.

In a conventional LIDAR system for meteorological observation, laser light sources suited to each individual observed element are employed in order to analyze the states of various observed elements. That is, in a conventional LIDAR system for meteorological observation, it has not been possible to use a single laser light source to simultaneously perform various LIDAR observations, to analyze the states of various observed elements. For example, in order to determine the water vapor distribution, use of differential absorption methods or vibrational Random scattering is effective. However, in the former differential absorption method, laser light at two particular wavelengths is necessary, and it was not possible to use these two different types of laser light for observation of other elements. Further, in the subsequent vibrational Raman scattering, the intensity of vibrational Raman scattering by water vapor is weaker by approximately three orders of magnitude than the intensity of Rayleigh scattering, and so in order to improve a signal-to-noise (S/N) ratio of the observation system, a high-output laser and large aperture optical telescope became necessary. As a result, the equipment size was increased, and cost performance was degraded. Also, in spectral analysis methods using the above-described using the above-described iodine absorption filter, there is an absorption spectra line in iodine near the second harmonic component ($\lambda$=532 nm) of Nd:YAG lasers, and so there may be the further problem that the laser light wavelength is constrained by absorption line.

Further, because laser light sources are used in LIDAR observations it is necessary to take sufficient account of safety for human beings (eye-safe characteristics). As such, in LIDAR observations, while selecting laser light which enables efficient observation of various scattering phenomena as described above, it is also necessary to develop a system which takes eye-safe characteristics into consideration.

Therefore, an object of the present invention is to propose a new LIDAR system for meteorological observation and a meteorological observation method using same, in order to resolve the problems described above.

More specifically, a first object of the present invention is to realize a LIDAR system for meteorological observation which is capable of efficiently and stably separating or blocking superposed Mie scattering signal components and Rayleigh scattering signal components, in order to perform high-precision observations using Rayleigh scattering LIDAR.

Further, a second object of the present invention is to realize a LIDAR system for meteorological observation which is capable of using a single laser light source to simultaneously perform various LIDAR observations and analyze the states of various observed elements.

Furthermore, a third object of the present invention is to realize a LIDAR system for meteorological observation which, while capable of efficient LIDAR observations, also takes eye-safe characteristics into consideration.

DISCLOSURE OF THE INVENTION

The present invention, intended to resolve the above problems, is a LIDAR system for meteorological observation in which pulsed laser light having a prescribed central frequency is emitted from a laser device, and reflected light is observed, and is characterized in comprising a spectroscope, which spectrally analyzes the reflected light for observation into light in the wavelength region of the above laser light, and light in wavelength regions other than the wavelength region of the above laser light; a first filter, which selectively passes light centered on a first frequency component along the light in the wavelength region of the above laser light, spectrally analyzed by the above spectroscope; first photodetection means, which detects light of the above first frequency component after being passed by the above first filter; a second filter, which selectively passes light centered on a second frequency component among the light in the wavelength region of the above laser light, spectrally analyzed by the above spectroscope; second photodetection means, which detects light of the above second frequency component after being passed by the above second filter; third photodetection means, which detects light of the wavelength region of the above laser light, spectrally analyzed by the above spectroscope; and fourth photodetection means, which detects light of wavelength regions other than the wavelength region of the above laser light, spectrally analyzed by the above spectroscope.

Here, light of the wavelength region of the above laser light, spectrally analyzed by the above spectroscope, is passed at least two times by the above first filter.

It is preferable that the first central frequency component which is to be passed by the above first filter be set at a position closer to the prescribed central frequency of the above laser light compared with the second central frequency component which is to be passed by the above second filter.

It is still more preferable that the first central frequency to be passed by the above first filter and the second central frequency to be passed by the above second filter are set respectively on either side centered on the frequency position at which the amount of change with temperature changes in the spectral power of Rayleigh scattering spectra according to a prescribed Rayleigh scattering spectral function is minimum.

Specifically, the first central frequency to be passed by the above first filter is set to approximately 1.0 GHz, and the second central frequency to be passed by the above second filter is set to approximately 3.5 GHz.

Further, a LIDAR system for meteorological observation of the present invention further comprises a monitoring device which monitors the laser light output emitted from the above laser device, and control means which controls the output of the above laser light such that the central frequency of the above laser light is constant, based on the above laser light output monitored by the above monitoring device.

Here, the above laser device has a seeder which supplies single-frequency light to the rod based on a prescribed applied voltage, and is characterized in that the above control means controls the applied voltage for the above seeder.

Furthermore, the above monitoring device comprises a third filter, which selectively passes light with a prescribed central frequency; a first photodetector, which detects, as a first monitor signal, the laser light emitted from the above laser device; a second photodetector, which detects, as a second monitor signal, the light passed by the above third filter; and peak detection means, which detects both a first peak value of the spectral power obtained by performing spectral analysis based on the first monitor signal detected by the above first photodetector, and a second peak value of the spectral power obtained by performing spectral analysis based on the second monitor signal detected by the above second photodetector.

The above control means is further characterized in that, if the central frequency of light passed by the above third filter is ν0, and the half-maximum width of the spectrum of light passed by the above third filter is Δν, then the voltage applied to the above seeder is controlled such that the central frequency of the above laser light is ν0+Δν/2, based on the first peak value and second peak value detected by the above peak detection means.

It is preferable that the above laser device be a Nd:YAG laser device, configured such that the third harmonic component of the generated laser light is extracted by a prescribed optical element and emitted.

In addition, a LIDAR system for meteorological observation of the present invention further comprises analysis means to perform prescribed analysis processing based on response signals detected by each of the above first through fourth photodetection means.

The above analysis means is characterized in that the distribution state of aerosols is determined based on response signals detected by the above first photodetection means and the above third photodetection means.

Further, the above analysis means is characterized in that a prescribed response function and prescribed air temperature measurement sensitivity are determined based on a prescribed Rayleigh scattering LIDAR equation based on response signals detected by the above first photodetection means and the above second photodetection means, and in that air temperature distribution states are determined based on the above determined prescribed response function and prescribed air temperature measurement sensitivity.

Furthermore, the above analysis means is characterized in that water vapor distribution states are determined based on a prescribed Raman scattering LIDAR equation, based on response signals detected by the above fourth photodetection means and on a prescribed Rayleigh scattering LIDAR equation, which in turn is based on response signals detected by the above second photodetection means.

In addition, the above analysis means is characterized in that the above response signals are corrected based on noise data collected in advance.

In this specification, "means" does not merely signify physical means, but also includes cases in which the functions of the means are realized by a computer using software (a program). Further, the functions of a single means may be realized by two or more physical means, and the functions of two or more means may be realized by a single physical means.

The invention of the above-described systems can also be understood as a method-type invention. Further, when each means is understood as a function which a program causes a computer to realize, the invention may also be understood as an invention of a program, or as an invention of recording media on which is recorded a program.

BRIEF DESCRIPTION OF THE DRAWINGS

FIG. 3 explains the relation between the frequency spectra of the laser light used in actual observations and the laser light obtained through a filter;

FIG. 5 explains the dual-path spectral analysis method of one aspect of the present invention;

BEST MODE FOR CARRYING OUT THE INVENTION

Figure 1:
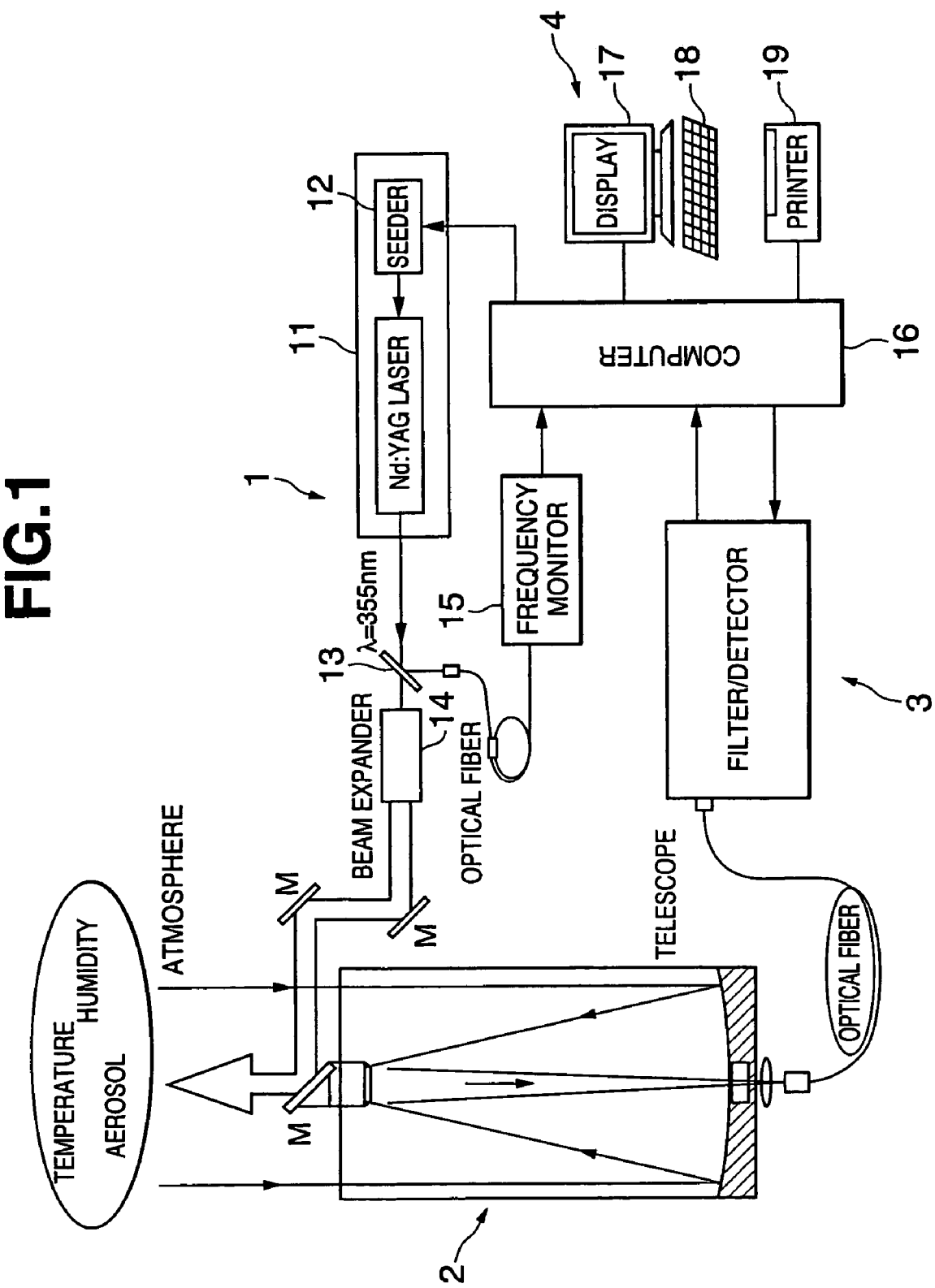
FIG. 1 shows in summary the basic configuration of a LIDAR system for meteorological observation of one aspect of the present invention.

Next, an aspect of the present invention is explained, referring to the drawings. The following aspect is an example used to explain the present invention, and the present invention is not limited to this aspect. The present invention can be implemented in various modes so long as there is no deviation from the gist of the invention.

FIG. 1 shows in summary the basic configuration of a LIDAR system for meteorological observation of one aspect according to the present invention. This LIDAR system for meteorological observation comprises a transmission system 1 which emits a single beam of pulsed laser light suitable for LIDAR observation toward the atmosphere (object for observation) in the observation region; a light-receiving system 2 which receives, as a response signal (LIDAR signal), the reflected light (scattered light) of laser light emitted from the transmission system 1; a spectral analysis system 3 which spectrally analyzes the response signal received by the light-receiving system 2 into the response signals required for various LIDAR observations; and a control/processing system 4 which controls the equipment comprised by each of these systems, and performs analysis processing of each observed element of the observation region based on response signals detected by the spectral analysis system 3. In this aspect, atmospheric temperature, water vapor amount, and aerosols are observed as objects for observation.

The laser device 11, forming the core of the transmission system 1, is a Q-switched Nd:YAG laser comprising a seeder 12 which supplies single-frequency light. Fluctuations in the mean output power (output power tolerance) of the laser device 11 in this example are held to within ±5%. As explained below, by performing feedback control in which the voltage applied to the seeder 12 from outside is controlled, the laser device 11 is configured such that laser light with a stable oscillation frequency is generated. The laser device 11 extracts the third harmonic component ($\lambda=355$ nm) of the high-frequency pulsed laser light generated and emits with output energy E0. Thus in this aspect, a laser source is used which emits laser light taking eye-safe characteristics into consideration.

The beam splitter 13 is located in the optical path of the laser light emitted from the laser device 11. The beam splitter 13 spectrally analyzes the light into main laser light for LIDAR observation, and laser light for stabilization and control of the oscillation frequency of the generated laser light (hereinafter called "laser light for monitoring"). After formation into an appropriate diameter by the beam expander 14, the main laser light is directed from a prescribed position toward the atmosphere. On the other hand, the laser light for monitoring extracted by the beam splitter 13 is guided to the frequency monitoring device 15 by an optical fiber. A high-resolution filter is provided in the frequency monitoring device 15. In order to monitor the frequency spectrum of the laser light currently being generated, the frequency monitor 15 divides the laser light for monitoring, guided by the optical fiber, into two channels (one passed through a filter, and one not passed), detects each of these using two photodetectors, not shown, and sends the detection result to the control/processing system 4. In the control/processing system 4, the computer 16 controls the voltage applied to the seeder 12 such that the laser light oscillation frequency is stabilized, based on the detection results sent from the frequency monitoring device 15.

The light receiving system 2 is a reflecting telescope which collects laser light reflected (scattered) from laser light emitted toward the atmosphere. In this aspect according to the present invention, a reflecting telescope is used with an effective diameter of approximately 250 mm, a focal length of 3000 mm, and a reflectivity of 90% or above at a wavelength $\lambda=355$ nm. Light for observation collected using the reflecting telescope (the response signal) is guided to the spectral analysis system 3 by an optical fiber.

The spectral analysis system 3 is configured so as to be capable of spectrally analyzing the response signal guided from the light-receiving system 2 via the optical fiber and detecting signals necessary for various LIDAR observations, that is, for three types of LIDAR observations: Rayleigh scattering LIDAR, RAMAN scattering LIDAR, and Mie scattering LIDAR. Response signals detected by each of the photodetection means (not shown) of the spectral analysis system 3 are sent to the control/processing system 4, and are analyzed. In this way, distributions of the atmospheric temperature, water vapor amounts, aerosols, and similar are obtained.

The control/processing system 4 is centered on a computer 16, and further comprises a display 17, keyboard 18, printer 19, and similar. The computer 16 is provided with an input/output port, and the computer 16 receives signals sent from equipment comprised by the various systems via this input/output port, and outputs control signals to equipment. The basic functions of the computer 16 are, under the general control of the LIDAR system for meteorological observation, to control the voltage applied to the seeder 12 such that the oscillation frequency of laser light is stabilized, based on the monitor signal from the frequency monitoring device 15, and to analyze the states of atmospheric temperature, water vapor content, and the like, based on response signals from each of the photodetection means of the spectral analysis system 3.

Figure 2:
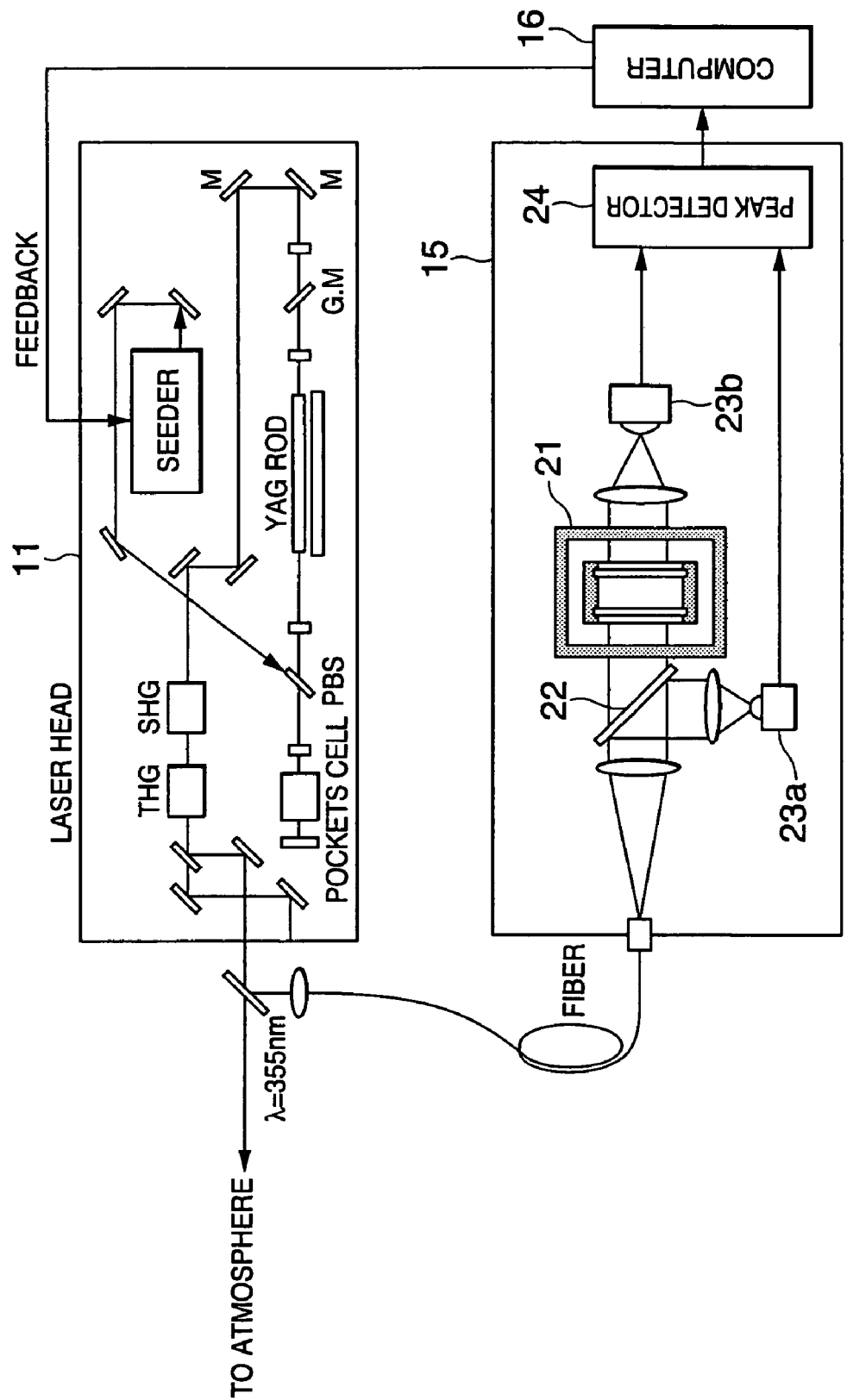
FIG. 2 shows the configuration of a frequency monitoring device of one aspect of the present invention.

FIG. 2 shows the configuration of the frequency monitoring device 15 of this aspect according to the present invention. As shown in the figure, the frequency monitoring device 15 comprises an etalon 21 as a high-resolution filter. The etalon 21 is a filter configured so as to selectively pass only light at integral multiples of a particular frequency. It is preferable that the etalon 21 be provided with a temperature controller (not shown) to eliminate instability in the frequency-pass characteristics due to temperature changes during continuous operation.

Laser light for monitoring which had been guided to the frequency monitoring device 15 via an optical fiber is spectrally analyzed by an internal beam splitter 22, and one component is made directly incident on the first photodetector 23a via a condensing lens. The photodetector 23a is a photodiode (PD), and the incident laser light is converted into a first electrical signal. The first electrical signal converted in this way is input to the peak detector 24. The other laser light component resulting from spectral analysis by the beam splitter 22 is made incident on the etalon 21, and after passing through the etalon, is incident, via a condensing lens, on the second photodetector 23b. The photodetector 23b is also a photodiode, and the second electrical signal resulting from conversion thereby is input to the peak detector 24.

The peak detector 24 detects the maximum value (peak value) of the power for both the first and the second electrical signals input for each pulse. The maximum value of the second electrical signal detected is proportional to the transmission function of the etalon 21. The peak values detected by the peak detector 24 are sent, for each pulse, to the computer 16.

In this way, the frequency monitor 15 has a two-channel construction which detects the peak values of both the laser light actually used in observations and the laser light obtained through the etalon 21.

The computer 16 performs feedback control of the voltage applied to the seeder 12 based on the respective input peak values. That is, the computer 16 utilizes the ability to cause fluctuations in the central frequency of the seeder 12 by means of an externally applied voltage to execute control such that the central frequency of the laser light used in actual observations is close to the half-maximum width of the transmission spectrum width of the etalon 21, as shown in FIG. 3($a$). In the figure, when the central frequency of the transmission spectrum of the etalon 21 is $v0$ and the half-maximum width thereof is $\Delta v$, then the computer 16 executes control until the central frequency of the laser light is equal to the half-maximum width $\Delta v/2$. As a result, the central frequency of the laser light used in actual observations becomes $v0+\Delta v/2$. More specifically, as shown in (b) in the figure, the rate of change Si of the ratio of the two peak values (Si=dRi/dv) is larger as the laser light central frequency approaches the half-maximum width of the transmission spectrum of the etalon 21, and is smaller as the central frequency recedes therefrom, but is maximum at the half-maximum width. Hence in this aspect, the computer 16 controls the voltage applied to the seeder 12 such that the absolute value of the rate of change Si of the ratio of the two peak values is maximum, and executes control such that the central frequency of the laser light used in actual observations is close to the half-maximum width of the transmission spectrum of the etalon 21.

In this way, the ratio of the peak values obtained from the frequency monitoring device 15 depends only on changes in the transmittance of the etalon 21, and does not depend on changes in the laser light output power; hence through feedback control of the seeder 12 based on this, the effect on peak values of fluctuations in the output energy of laser light output from the laser device 11 can be eliminated.

Figure 4:
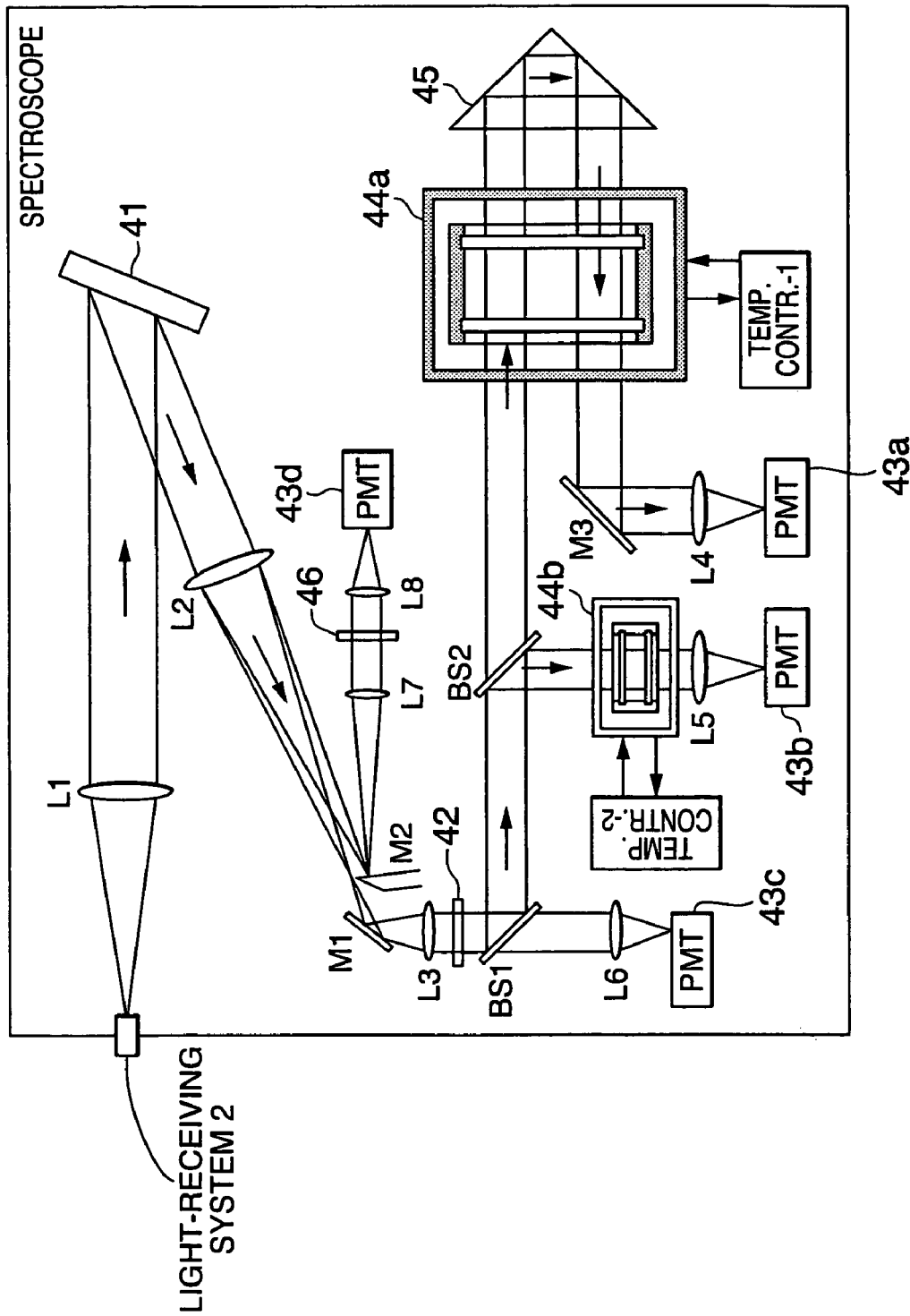
FIG. 4 explains the configuration of a spectral analysis system of one aspect of the present invention.

FIG. 4 is a drawing to explain the configuration of the spectral analysis system 3 of one aspect according to the present invention. The spectral analysis system 3 spectrally analyzes and detects a single observation light beam (response signal) necessary for various LIDAR observations, that is, three types of LIDAR observations—Rayleigh scattering LIDAR, Raman scattering LIDAR, and Mie scattering LIDAR.

Observation light guided from the light-receiving system 2 via an optical fiber is made incident on the diffraction grating 41 via the lens L1, and light at each prescribed wavelength is reflected in prescribed directions. Light diffracted by the diffraction grating 41 in each prescribed wavelength region is collected in a prescribed direction using the lens L2, and light in the laser light wavelength region, and light in other wavelength regions, are each extracted by the mirror M1 and mirror M2. Light in which are superposed Rayleigh scattered light, Mie scattered light, and background light near wavelength 355 nm, extracted by the mirror M1, is made incident on the band-pass filter 42 via the lens L3, and the band-pass filter 42 blocks the background light. The band-pass filter 42 is a filter used to cut out background light with a broad spectral distribution, and in general is designed to have a considerably broader transmission spectral width than etalons. Light which has passed through the band-pass filter 42 is separated into two beams by the beam splitter BS1, one beam of which is further separated into two beams by the beam splitter BS2.

Light beams separated by the beam splitter BS2 are made incident on the etalon 44a and the etalon 44b respectively. The etalon 44a and etalon 44b are filters which selectively pass light at different frequencies. It is preferable that the etalon 44a and etalon 44b be provided with temperature controllers (not shown) to eliminate instability in the frequency transmission characteristics due to temperature changes resulting from continuous operation.

The central frequency $v1$ of light passed by the etalon 44a (hereinafter called the "passed central frequency") is set so as to be closer to the central frequency $v0$ of the Mie scattering spectrum than the passed central frequency $v2$ of the etalon 44b. It is preferable that in the Rayleigh scattering spectrum (forming a Gaussian distribution curve) resulting from the temperature-dependent Rayleigh scattering spectrum function, as shown in FIG. 5($a$), the passed central frequencies $v1$ and $v2$ of the etalon 44a and the etalon 44b are set on either side of, and centered on, the frequency f at which the amount of change in the spectral power with temperature changes is smallest.

In other words, the Rayleigh scattering spectrum due to the temperature-dependent Rayleigh scattering spectrum function forms a Gaussian distribution curve indicating the inversion characteristic with changes in temperature, substantially centered on the frequency f, as shown in (b) of FIG. 5. Specifically, when the atmospheric temperature varies in the range from −50° C. to 30° C., the frequency f at which the amount of change in the spectral power is smallest is within the range of half-maximum half-widths (HWHMs) of the Rayleigh scattering spectrum, from approximately 1.7 to 1.95 GHz. Hence in this aspect according to the present invention, the central frequency ν1 of light passed by the etalon 44a is set at 1.0 GHz, and the central frequency ν2 of light passed by the etalon 44b is set at 3.5 GHz.

Light which is incident on the etalon 44a from the beam splitter BS2 and passes through the etalon 44a is deflected by the prism 45, and again passes through the etalon 44a without overlapping. Hence the etalon 44a adopted for use has a large diameter, such that light which is to be detected for LIDAR observations can pass through at least twice without overlapping. The spectral analysis method in which light to be detected is passed through the etalon 44a at least twice shall be called the "dual-pass spectral analysis method".

As explained above, the passed central frequency ν1 of the etalon 44a is close to the central frequency of the Mie scattering spectrum, so that when light passes only once through the etalon 44, the Mie scattering blocking rate is not sufficient; but by using the dual-path spectral analysis method, the blocking rate for Mie scattering is improved dramatically.

Light which has passed once again through the etalon 44a is made incident on the first photomultiplier tube (PMT) 43a via the mirror M3 and lens L4, and is converted into an electrical signal. Light from the beam splitter BS2 which is incident on and passes through the etalon 44b further passes through the lens L5 and is incident on the second photomultiplier tube 43b, and is converted into an electrical signal.

One of the light beams separated by the beam splitter BS1 is incident on the third photomultiplier tube 43c via the lens L6, and is converted into an electrical signal according to the number of scattered signal photons.

Of the light diffracted by the diffraction grating 41 shown in FIG. 4, the light extracted by the mirror M2 via the lens L2 is made incident on the interference filter 46 via the lens L7. Light which passes through the interference filter 46 is incident on the fourth photomultiplier tube 43d via the lens L8, and is converted into an electrical signal.

The response signals detected by the photomultiplier tubes 43a to 43d are input to the computer 16, and after A/D conversion are selected for use as appropriate to each observed element, and are subjected to analyses. That is, the computer 16 determines atmospheric temperatures at different heights by solving the Rayleigh scattering LIDAR equation based on two channels of response signals which have been spectrally analyzed by the etalon 44a and the etalon 44b. The computer 16 also solves the vibrational Raman scattering LIDAR equation for water vapor amounts at different heights based on one channel of response signals spectrally analyzed by the diffraction grating 41 and interference filter 46 and on one channel of Rayleigh scattering response signals spectrally analyzed by the etalon 44a.

Further, the computer 16 solves the Mie scattering LIDAR equation for aerosols at different heights based on one channel of response signals spectrally analyzed by the diffraction grating 41 and on one channel of response signals spectrally analyzed by the etalon 44a.

More specifically, states of atmospheric temperatures, water vapor amounts, and aerosol concentrations are determined as follows. That is, using the general LIDAR equation, the number of scattering signal photons N(z) per unit gate time of the photomultiplier tube 43 is expressed by $$N(z) = \left(\frac{K}{z^2}\right) q \beta(z) f_d \exp\left(-2 \int_0^z \alpha(z) \, dz\right) \quad (1)$$

$$K = \left(\frac{E_0}{h\nu}\right) A \Delta z Y(z) \quad (2)$$

Here $E_0$ is the laser device output energy, $Y(z)$ is the visual field overlap function of the transmission and reception optical systems at distance z, q is the corresponding channel efficiency (product of the optical system efficiency and the PMT quantum efficiency), $\alpha(z)$ is the atmosphere extinction coefficient, $\beta(z)$ is the volume backscattering coefficient (a function of the scattering body density and the scattering cross-section), $f_d$ is the filter transmission function, A is the aperture area of the reception system, z is the height, and $\Delta z$ is the height resolution. Of these, the parameters other than the atmosphere extinction coefficient $\alpha(z)$ and the volume backscattering coefficient $\beta(z)$ are known quantities provided to the system.

The Rayleigh scattered light, Mie scattered light and vibrational Raman scattered light detected by the photomultiplier tubes 43a to 43d are expressed by corresponding LIDAR equations as follows.

First, the numbers of photos $N_1(z)$ and $N_2(z)$ received by the photomultiplier tubes 43a and 43b, which are Rayleigh scattering channels, are expressed by $$N_i(z) = \left(\frac{K}{z^2}\right) q_i \beta_m(z) f_i(T, P) \exp\left(-2 \int_0^z \alpha(z) \, dz\right) \quad i = 1, 2 \quad (3)$$

$$f_i(T, P) = \int R(\nu, T, P) F_i(\nu) B(\nu) \, d\nu \quad (4)$$

Here $R(\nu,T,P)$ is the Rayleigh scattering spectral function (wherein T is the atmospheric temperature and P is the air pressure), $F_i$ is the transmission spectral function for each of the etalons, $B(\nu)$ is the band-pass filter transmission spectral function, and $B_m(z)$ is the scattering function for air molecules. Of these, the transmission spectral functions $F_i$ of the etalons and the band-pass filter transmission spectral function $B(\nu)$ are known quantities provided to the system.

The number of photos $N_3(z)$ received by the photomultiplier tube 43c, which is an energy channel, is expressed by $$N_3(z) = \frac{K}{z^2} q_3 (\beta_m(z) + \beta_a(z)) \exp\left(-2 \int_0^z \alpha(z) \, dz\right) \quad (5)$$

Here $\beta_a(z)$ is the aerosol scattering coefficient.

Further, the number of photos $N_4(z)$ received by the photomultiplier tube 43d, which is a water vapor Raman scattering channel, is expressed by $$N_4(z) = \frac{K}{z^2} q_4 \beta_{H2O}(z) \exp\left(-\int_0^z (\alpha_{\lambda 0}(z) + \alpha_{\lambda H2O}(z))\, dz\right) \quad (6)$$

Here $\beta_{H2O}(z)$ is the water vapor scattering coefficient.

The scattering coefficients for Mie scattering and for Rayleigh scattering are derived as follows. That is, from eq. (3) and eq. (5), the scattering ratio $S(z)$ of Mie scattering to Rayleigh scattering is expressed by $$S(z) = \frac{\beta_a(z)}{\beta_m(z)} = \frac{q_1 f_1 N_3(z) - q_3 N_1(z)}{q_3 N_1(z)} \quad (7)$$

$$\frac{\alpha_m(z)}{\beta_m(z)} = \frac{8\pi}{3} \quad (8)$$

When this eq. (8) is substituted into eq. (3) with i=1, the scattering coefficient $\beta_m(z)$ for Rayleigh scattering by air molecules is $$\beta_m(z) = \frac{N_1(z) z^2}{K q_1 f_1}\left[1 - \frac{16\pi}{3 K q_1 f_1}\int_0^z N_1(z) z^2\, dz\right]^{-1} \quad (9)$$

Further, on substituting the $\beta_m(z)$ obtained from eq. (9) into eq. (7), the aerosol scattering coefficient $\beta_a(z)$ for Mie scattering is $$\beta_a(z) = \frac{q_1 f_1 N_3(z) - q_3 N_1(z)}{q_3 N_1(z)} \beta_m(z) \quad (10)$$

Here $f_1$ is a parameter obtained by system calibration.

Based on LIDAR equations obtained in this way, the atmospheric temperature is derived as follows. First, the response function $R_s$ and air temperature measurement sensitivity $S_T$ are expressed by $$R_s(z, T, P) = \frac{a \cdot N_1(z, T) - N_2(z, T)}{N_1(z, T) + N_2(z, T)} \quad (11)$$

$$S_T = \frac{1}{R_s} \frac{\partial R_s}{\partial T} \quad (12)$$

Here a is the ratio of the transmittances of Mie scattering components by the etalons 44a and 44b, and is a parameter obtained by calibration of the system.

In this way, in this aspect the response function $R_s$ is determined from the difference between the number of scattering signal photons $N_1$ and the number of scattering signal photons $N_2$, which have mutual inversion characteristics; hence the system S/N ratio can be increased, and the Mie scattering blocking rate can be further improved. Together with this, the air temperature measurement sensitivity $S_T$ can also be increased.

The absolute temperature $T(z)$ of the air is then $$T(z) = T(z_0) + \frac{R_s(z) - R_s(z_0)}{S_T} \quad (13)$$

Here $T(z_0)$ is a reference temperature (the air temperature at height $Z_0$).

It is preferable that the response function $R_s$ and air temperature measurement sensitivity $S_T$ be calibrated based on data obtained from calibration experiments using other measurement equipment (for example, a radiosonde using a balloon).

The height distribution of the water vapor density is derived as follows. From eq. (6) for water vapor vibrational Raman scattering and eq. (3) for Rayleigh scattering by air molecules, the ratio of outputs of the two channels becomes $$\frac{N_1(z)}{N_4(z)} = \frac{q_1 f_1 \beta_m(z)}{q_4 \beta_{H2O}(z)} \exp\left[-\int_0^z (\alpha_{\lambda 0}(z) - \alpha_{H2O}(z))\, dz\right] \quad (14)$$

Further, it can be assumed that $\alpha_{\lambda,0}$ and $\alpha_{H2O}z$ are substantially equal, so that the water vapor scattering coefficient $\beta_{H2O}$ is $$\beta_{H2O}(z) = \frac{q_1 f_1 \beta_m(z)}{q_4} \frac{N_4(z)}{N_1(z)} \quad (15)$$

Further, the water vapor density height distribution $n_{H2O}(z)$ is $$n_{H2O}(z) = \frac{q_1}{q_4} f_1 \beta_m(z) \frac{N_4(z)}{N_1(z)} \Big/ \left(\frac{d\sigma}{d\Omega}\right)_{H2O} \quad (16)$$

Thus in this aspect according to the present invention, by solving the water vapor Raman scattering LIDAR equation (eq. (6)) in addition to the air molecule Rayleigh scattering LIDAR equation (eq. (3)), the height distribution of the water vapor density can be determined. Hence compared with cases in the prior art which use nitrogen molecule vibrational Raman scattering, regarded as necessary for water vapor Raman scattering LIDAR, in this aspect it is possible to perform high-precision observations over long distances by using high-output Rayleigh scattering.

Figure 6:
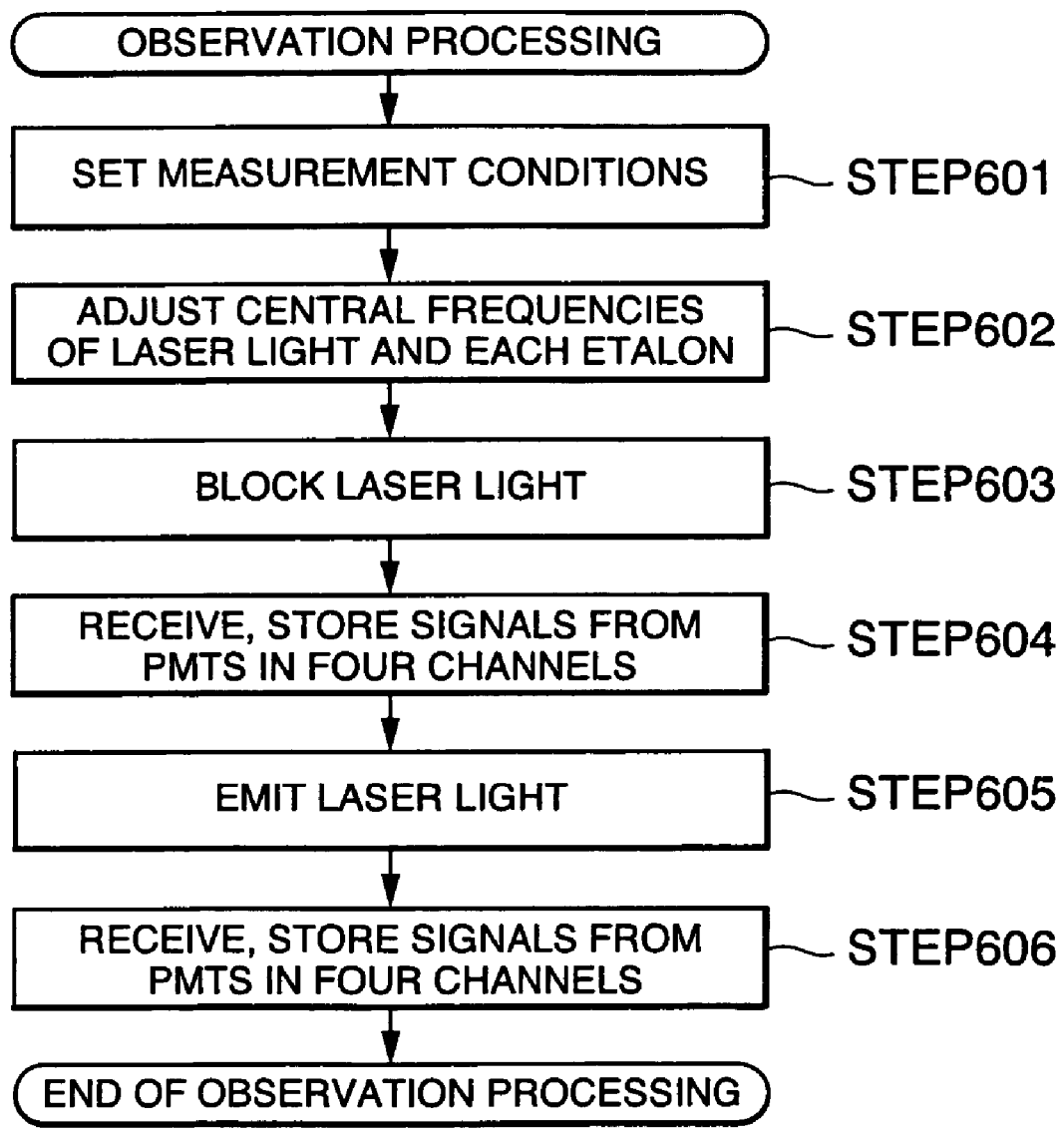
FIG. 6 illustrates a flowchart explaining the flow of processing of a LIDAR system for meteorological observation of one aspect of the present invention.
Figure 7:
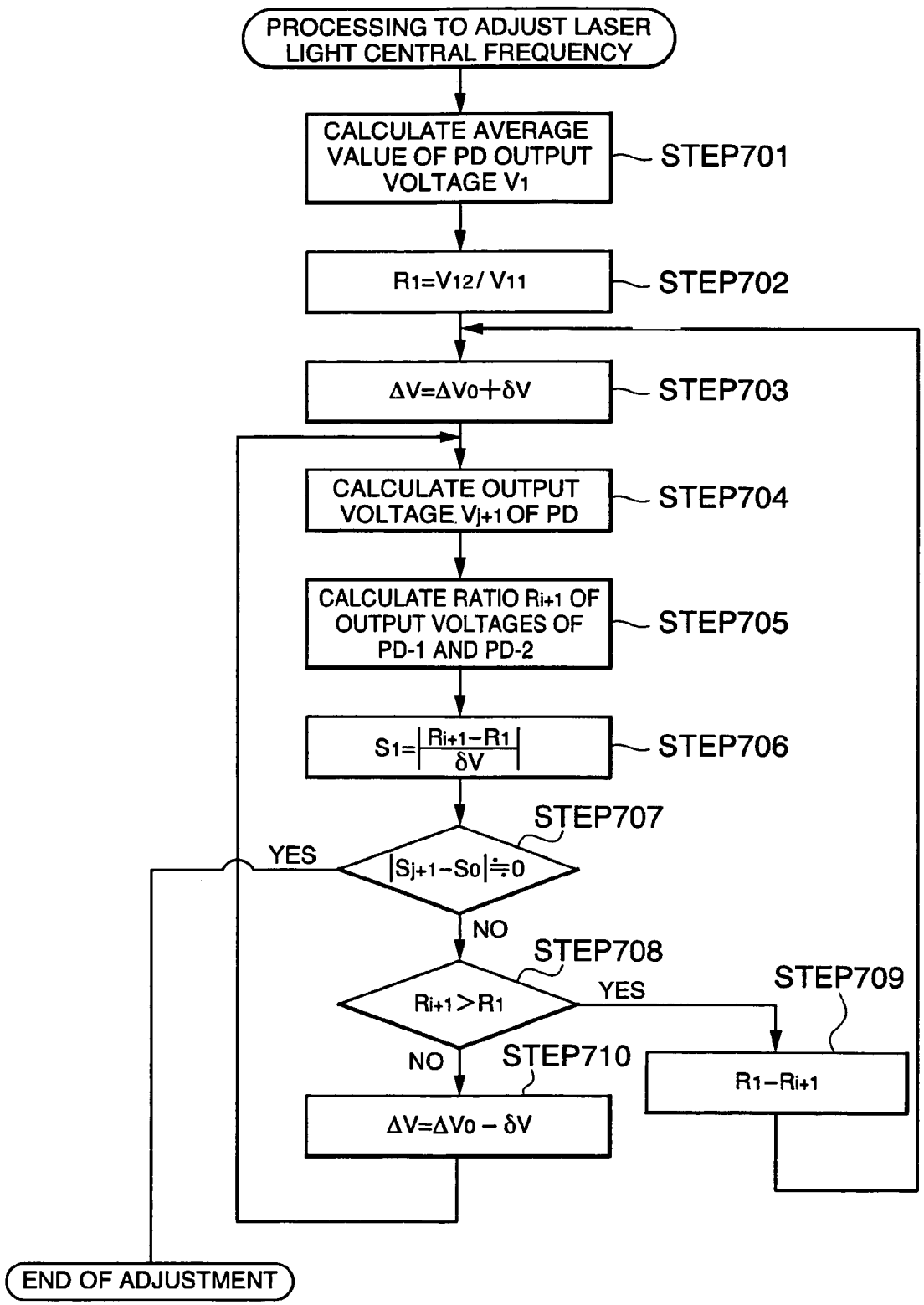
FIG. 7 illustrates a flowchart explaining the initial processing to adjust the central frequency of laser light.
Figure 8:
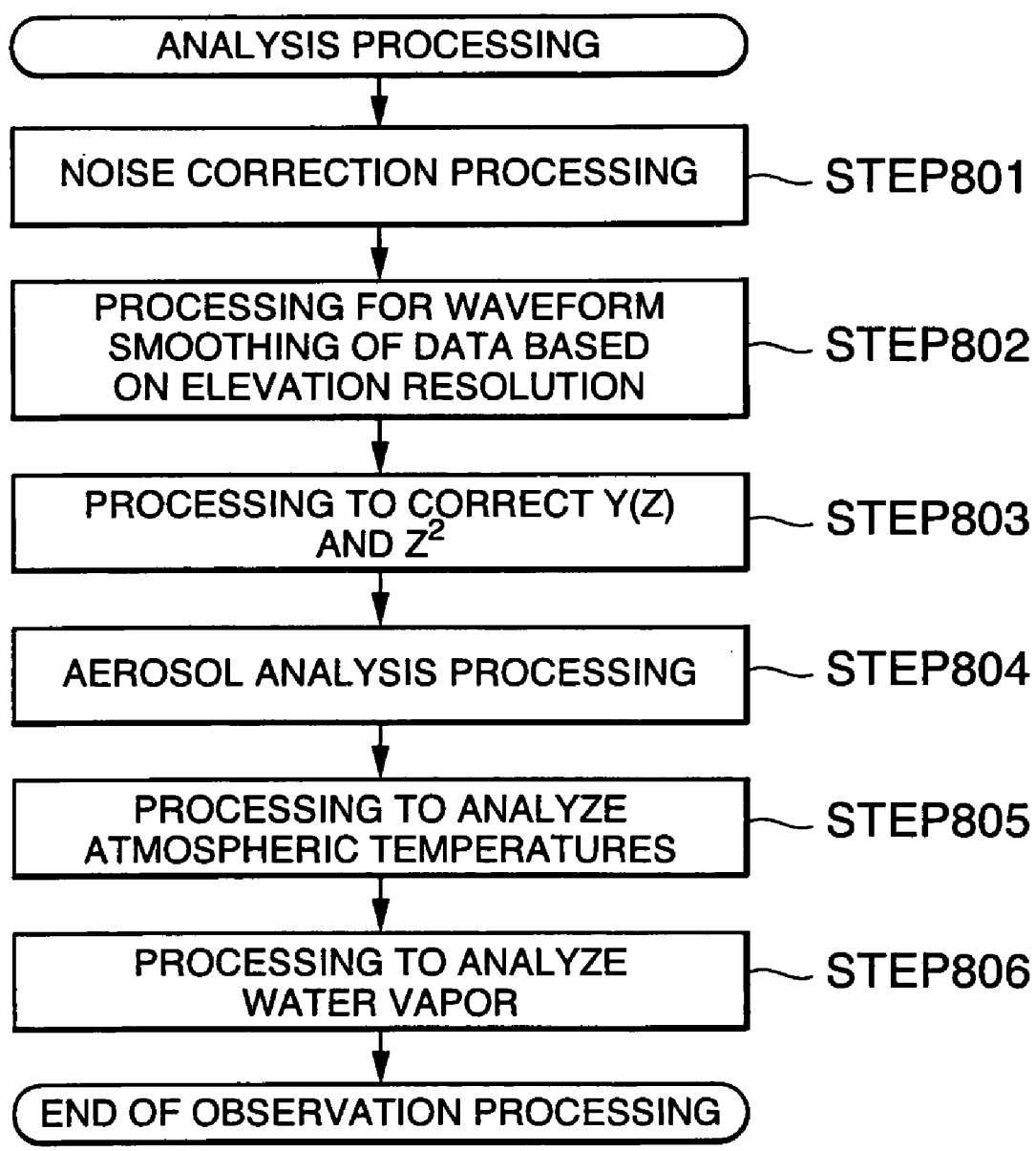
FIG. 8 illustrates a flowchart explaining the flow of processing of a LIDAR system for meteorological observation of one aspect of the present invention.

Next, the flow of processing of a LIDAR system for meteorological observation configured as described above is explained, referring to the flowcharts shown in FIG. 6 through FIG. 8.

Meteorological observations using this LIDAR system for meteorological observations can be divided into a preparation and observation processing phase, and a phase in which collected observation data is analyzed. FIG. 6 is a flowchart used to explain preparation and observation processing using this LIDAR system for meteorological observation.

When power to the LIDAR system for meteorological observation is turned on, the equipment units begin operation. Here, it is preferable that sufficient preheating time be provided to the laser device 11 and to temperature controllers provided in the various equipment. When the power to the computer 16 is turned on, settings such as measurement heights, resolutions, sampling times, number of accumulations, voltages applied to photomultiplier tubes 43, and other measurement conditions are accepted (STEP 601). Next, the computer 16 performs initial adjustments of the central frequency of the laser light of the laser device 11 and of the passed central frequency of the etalon 21 (STEP 602).

FIG. 7 is a flowchart used to explain processing to adjust the central frequency of the laser light of the laser device 11 and the passed central frequency of the etalon 21. The computer 16 collects the output voltages Vi of the photodetectors 23a and 23b when there is a shot of laser light from the laser device 11, and computes the average value (STEP 701). Here, the average value of the output voltages per 100 shots of laser light are calculated. Next, the computer 16 computes the ratio Ri of output voltages from the photodetector 23a and the photodetector 23b (STEP 702), and calculates the offset voltage ΔV for the seeder 12 (STEP 703). The offset voltage ΔV is calculated from $$\Delta V = \Delta V0 + \delta V$$

Here ΔV0 is the initial voltage applied to the seeder 12, and δV is the seeder shift voltage, where δV<<ΔV0. Immediately after the power is turned on, the offset voltage ΔV is equal to ΔV0.

The computer 16 calculates, for 100 shots for example, the output voltages Vi+1 of the photodetectors 23a and 23b (STEP 704), and calculates the ratio of output voltages Ri+1 for the photodetector 23a and the photodetector 23b (STEP 705). Next, the computer 16 calculates the rate of change Si of the output voltage ratio (STEP 706). The rate of change Si of the output voltage ratio is determined using $$S_i = \left| \frac{R_{i+1} - R_i}{\delta V} \right| \qquad (17)$$

Further, the difference between the rate of change Si of the voltage ratio currently obtained and the rate of change of setting S0 obtained from the configuration of the transmission characteristics of the etalon 21 is calculated, and a judgment is made as to whether the difference is effectively 0, that is, whether the difference is within a prescribed tolerance (STEP 707). Specifically, the computer 16 judges whether the difference between the current rate of change of the output voltage ratio Si and the set rate of change of setting S0 obtained from the configuration is equal to 5% or less. If the computer 16 judges that the difference is not within 5%, a judgment is made as to which is larger among the output voltage ratio Ri+1 and the output voltage ratio Ri (STEP 708).

If the computer 16 judges that the output voltage ratio Ri+1 is larger ("Yes" in STEP 708), after setting the output voltage ratio Ri to the output voltage ratio Ri+1 (STEP 709), processing returns to STEP 703 in order to raise the current offset voltage ΔV by the amount δV. On the other hand, if it is judged that the output voltage ratio Ri+1 is smaller ("No" in STEP 708), the computer 16 lowers the current offset voltage ΔV by the amount δV (STEP 710), and processing returns to STEP 704.

After the computer 16 has performed initial adjustment of the offset voltage ΔV for the seeder 12 so as to fall within the system tolerance, as described above, measurements by the system are begun. The computer 16 applies a stable constant offset voltage ΔV to the seeder 12 during system operation.

When the computer 16 ends initial adjustment of the central frequency of the laser light, the laser light is cut off (STEP 603), reception of signals from the four channels of each of the photomultiplier tubes 43a to 43d is begun, and these are accumulated as noise data (STEP 604). The laser light blocking state is a state in which laser light is emitted, but is not emitted in the direction of the object for observation. This accumulation of noise signals is in order to receive background light together with dark currents latent in the system, and use these in noise reduction processing.

After collecting and accumulating noise data in this way, the computer 16 actually irradiates the object of observation with laser light (STEP 605), and while measuring the time begins to receive signals from the four channels of the photomultiplier tubes 43a to 43d, and accumulates this as observation data (STEP 606). That is, the observation data is a data series represented as a time-power waveform.

After collecting and accumulating the necessary observation data, the computer 16 performs noise reduction processing of the observation data, based on the previously collected and accumulated noise data (STEP 801 in FIG. 8). In this example, the computer 16 calculates the difference between the noise data and the observation data. Next, the computer 16 performs smoothing of data based on the height resolution (STEP 802). In this example, after the computer 16 converts the collected and accumulated observation data in the time-axis domain into height-axis domain data using the speed of light c, sliding average data items are calculated according to a prescribed sampling interval, and by further using the moving average method, the data, as height-power waveforms, is smoothed. Then, the computer 16 corrects Y(z) and $z^2$ (STEP 803). Here Y(z) is the visual field overlap function of the transmission and reception optical systems at distance z.

At the stage in which data necessary for analysis using LIDAR equations has been prepared, the computer 16 first performs aerosol analysis processing (STEP 804), atmospheric temperature analysis processing (STEP 805), and then performs water vapor analysis processing (STEP 806).

Figure 9:
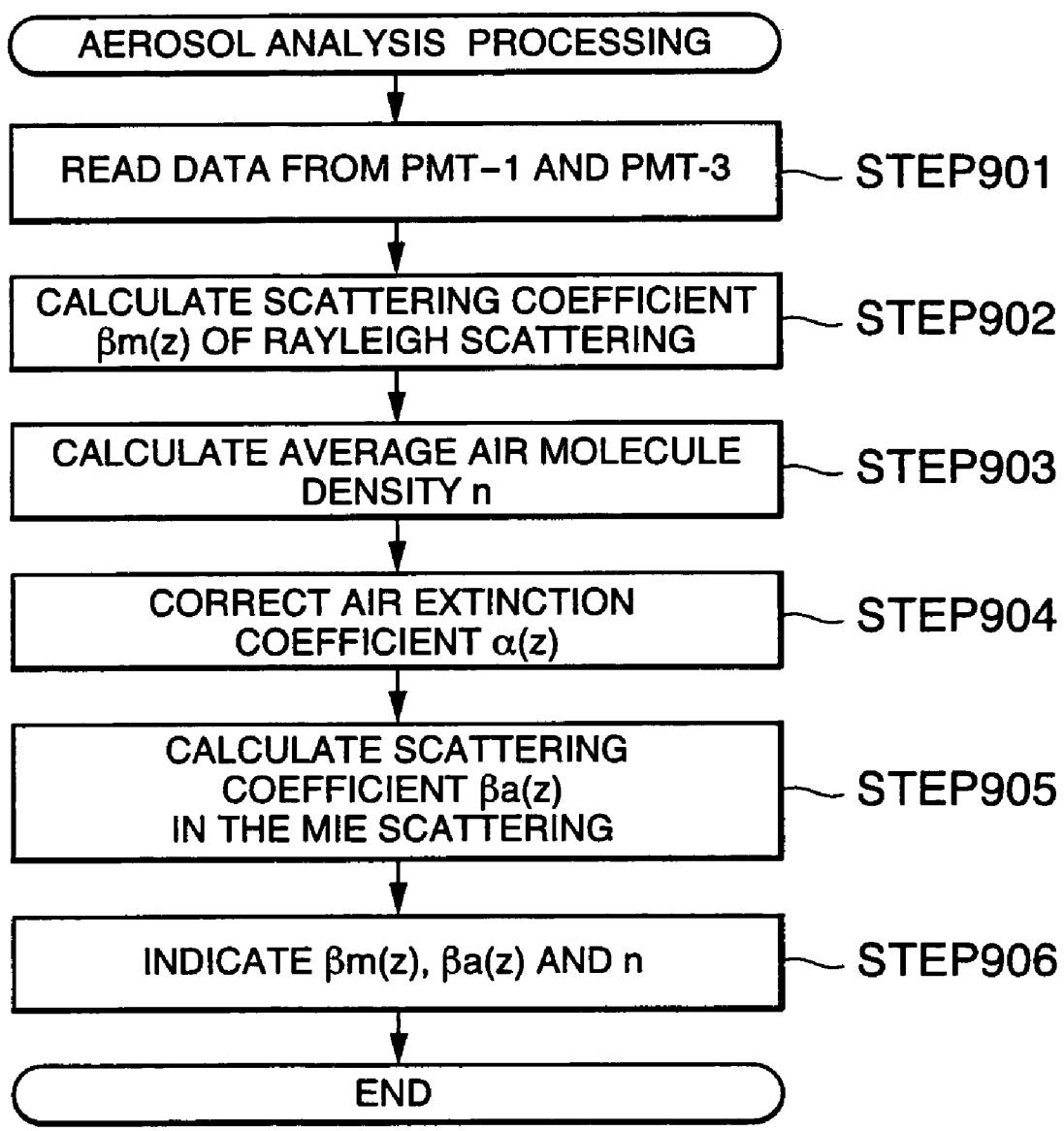
FIG. 9 illustrates a flowchart explaining the flow of processing to analyze aerosol distribution in one aspect of the present invention.

FIG. 9 is a flowchart which explains the flow of processing to analyze the aerosol distribution. As shown in the figure, the computer 16 reads observation data collected from the photomultiplier tubes 43a and 43c (STEP 901). The computer 16 calculates the scattering coefficient βm(z) for Rayleigh scattering (STEP 902), and calculates the average air molecule density n using the average value of the scattering cross-section for air molecules (STEP 903). Next, the computer 16 performs processing to correct the air extinction coefficient α(z) (STEP 904), then calculates the scattering coefficient βa(z) for Mie scattering (STEP 905), and outputs the calculated scattering coefficient βm(z) for Rayleigh scattering, scattering coefficient βa(z) for Mie scattering, and average air molecule density n as the analysis results (STEP 906).

Figure 10:
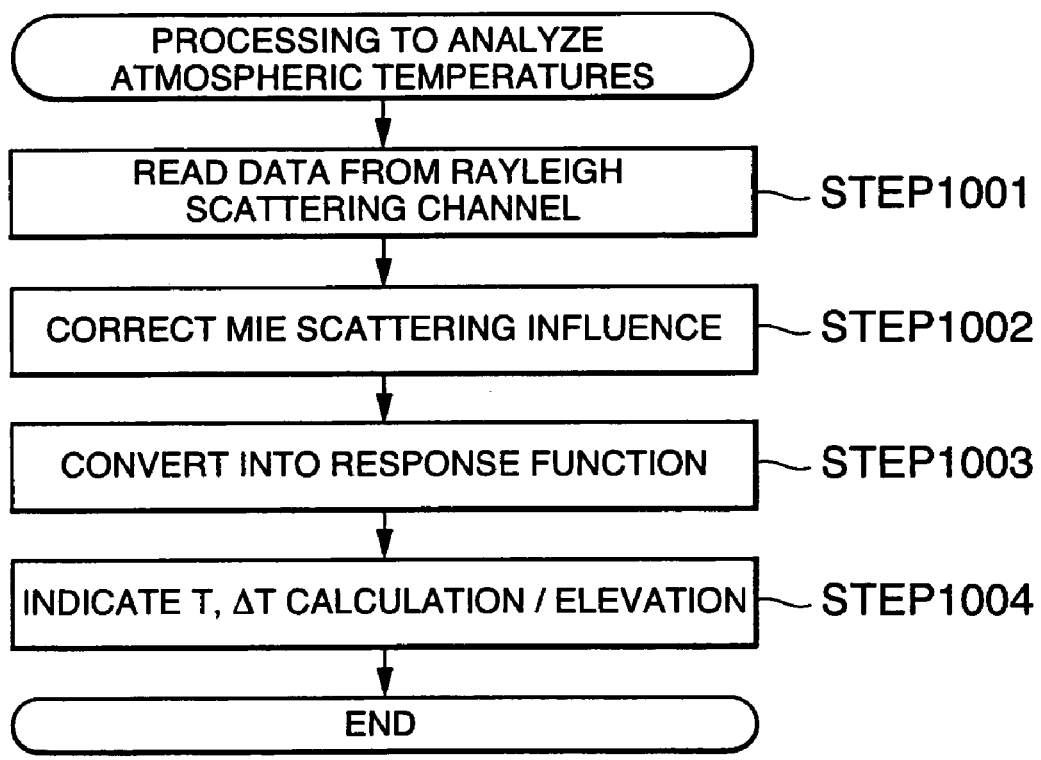
FIG. 10 illustrates a flowchart explaining the flow of processing to analyze atmospheric temperature distribution in one aspect of the present invention; and, FIG. 11 illustrates a flowchart explaining the flow of processing to analyze water vapor distribution in one aspect of the present invention.

FIG. 10 is a flowchart which explains the flow of processing to analyze the atmospheric temperature distribution. The computer 16 reads data collected and accumulated from the Rayleigh scattering channels by the photomultiplier tubes 43a and 43b (STEP 1001), and performs correction of this data to eliminate the effects of Mie scattering (STEP 1002). Next, the computer 16 determines the response functions ΔRS and Rs (STEP 1003), and then determines the atmospheric temperature T and ΔT, and outputs these as the analysis results (STEP 1004).

Figure 11:
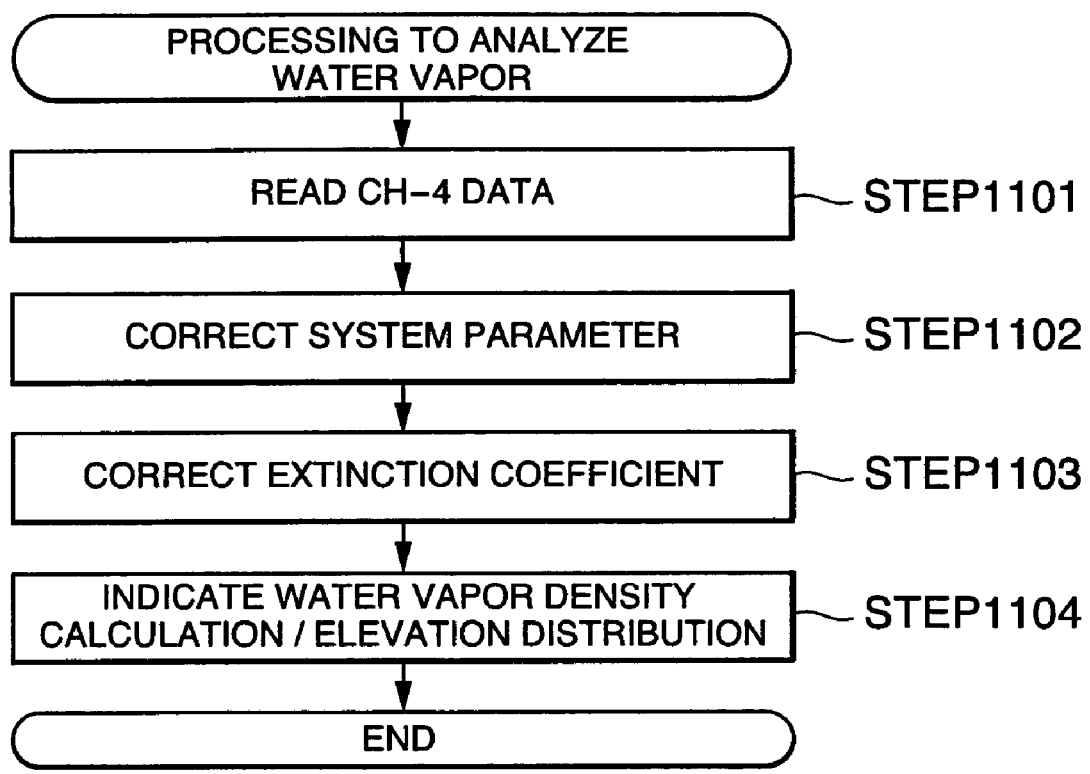

FIG. 11 is a flowchart which explains the flow of processing to analyze the water vapor distribution. The computer 16 reads data collected and accumulated from the Raman scattering channel by the photomultiplier tube 43d (STEP 1101), and performs system parameter corrections for this data (STEP 1102). Next, the computer 16 corrects the extinction coefficient (STEP 1103), uses Rayleigh scattering channel data to determine the water vapor density nH20(z), and outputs this as the analysis results (STEP 1104).

In these flowcharts, the flow of processing is configured sequentially, but the present invention is not limited thereto, and a configuration may be employed in which the order of processing is changed as appropriate, or processing is executed in parallel, so long as no contradictions in the processing results occur.

Thus by means of this aspect, etalon filters are used in place of iodine absorption filters, so that Mie scattering signal components and Rayleigh scattering signal components can be spectrally analyzed more reliably and efficiently. Further, by means of this aspect, the newly occurring problem in which Mie scattering signal components cannot be adequately blocked using only a physical technique of spectral analysis such as an etalon filter is addressed, and moreover processing is performed to calculate the difference of two channels of Rayleigh scattering signals, so that the Mie scattering signal component can be blocked with an extremely high blocking rate. Further, according to this aspect of the present invention, a LIDAR system for meteorological observation is realized in which a single laser light source is employed with consideration paid to eye-safe characteristics, to perform various LIDAR observations simultaneously, something not possible using conventional LIDAR systems for meteorological observation.

INDUSTRIAL APPLICABILITY

According to the present invention, a LIDAR system for meteorological observation is realized in which a single laser light beam is used to simultaneously perform various LIDAR observations, and the states of the various observed elements can be analyzed extremely efficiently.

The invention claimed is:

1. A lidar system for meteorological observation, in which pulsed laser light having a prescribed central frequency is emitted from a laser device and reflected light thereof is observed, comprising:
   a spectral analyzer for spectrally analyzing reflected light for observation into light in the wavelength region of the laser light and light in wavelength regions other than the wavelength region of the laser light;
   a first filter for selectively passing light centered on a first frequency component among the light of the wavelength region of the laser light which has been spectrally analyzed by said spectral analyzer;
   a first photodetection unit configured to detect the first frequency component light having passed through said first filter;
   a second filter for selectively passing light centered on a second frequency component among the light of the wavelength region of the laser light which has been spectrally analyzed by said spectral analyzer;
   a second photodetection unit configured to detect the second frequency component light having passed through said second filter;
   a third photodetection unit configured to detect the light of the wavelength region of said laser light having been spectrally analyzed by said spectral analyzer; and,
   a fourth photodetection unit configured to detect the light of wavelength regions other than the wavelength region of the laser light having been spectrally analyzed by said spectral analyzer.

2. The lidar system for meteorological observation according to claim 1, wherein light of the wavelength region of the laser light which has been spectrally analyzed by said spectral analyzer is passed at least two times through said first filter.

3. The lidar system for meteorological observation according to claim 1 or claim 2, wherein the first central frequency component to be passed by said first filter is set at a position closer to the prescribed central frequency of the laser light than the second central frequency component to be passed by said second filter.

4. The lidar system for meteorological observation according to claim 3, wherein the first central frequency to be passed by said first filter and the second central frequency to be passed by said second filter are respectively set on either side of and centered on the position of the frequency at which an amount of change in the spectral power with respect to temperature changes of the Rayleigh scattering spectrum according to a prescribed Rayleigh scattering spectrum function is minimum.

5. The lidar system for meteorological observation according to claim 1, wherein the first central frequency to be passed by said first filter is set to substantially 1.0 GHz, and that the second central frequency to be passed by said second filter is set to substantially 3.5 GHz.

6. The lidar system for meteorological observation according to claim 1, further comprising a monitoring device for monitoring output of laser light emitted from said laser device, and a control unit configured to control output of the laser light such that the central frequency of said laser light is constant, based on the output of the laser light monitored by said monitoring device.

7. The lidar system for meteorological observation according to claim 6, wherein said laser device has a seeder which supplies single-frequency light to a rod based on a prescribed applied voltage, and said control unit controls the voltage applied to said seeder.

8. The lidar system for meteorological observation according to claim 7, wherein said monitoring device comprises: a third filter which selectively passes light with a prescribed central frequency;
   a first photodetector which detects laser light emitted from said laser device as a first monitored signal;
   a second photodetector which detects light passed by said third filter as a second monitored signal; and
   a peak detection unit which detects both a first peak value of spectral power, obtained by analysis of a spectrum based on the first monitored signal detected by said first photodetector, and a second peak value of spectral power, obtained by analysis of a spectrum based on the second monitored signal detected by said second photodetector.

9. The lidar system for meteorological observation according to claim 8, wherein said control unit controls the voltage applied to said seeder such that, when .nu.0 is the central frequency of light passed by said third filter and .DELTA. .nu. is the half-maximum full width of the spectrum of light passed by said third filter, the central frequency of said laser light becomes equal to .nu.0+.DELTA. .nu./2, based on the first peak value and second peak value detected by said peak detection unit.

10. The lidar system for meteorological observation according to claim 9, wherein said control unit controls the voltage applied to said seeder such that the absolute value of the rate of change of the ratio of said first peak value to said second peak value is maximum.

11. The lidar system for meteorological observation according to claim 1, wherein said laser device is an Nd:YAG laser device, and that the third harmonic component of the laser light generated is extracted by a prescribed optical element and emitted.

12. The lidar system for meteorological observation according to claim 1, further comprising an analysis unit configured to perform prescribed analysis processing, based on response signals detected by said first through fourth photodetection unit.

13. The lidar system for meteorological observation according to claim 12, wherein said analysis unit determines the aerosol distribution state based on response signals detected by said first photodetection unit and said third photodetection unit.

14. The lidar system for meteorological observation according to claim 12, wherein said analysis unit determines a prescribed response function and prescribed air temperature measurement sensitivity based on a prescribed Rayleigh scattering LIDAR equation based on response signals detected by said first photodetection unit, and said second photodetection unit, and determines the atmospheric temperature distribution state based on said determined prescribed response function and prescribed air temperature measurement sensitivity.

15. The lidar system for meteorological observation according to claim 12, wherein said analysis unit determines the water vapor distribution state, based on a prescribed Rayleigh scattering LIDAR equation based on response signals detected by said first photodetection unit, and based on a prescribed Raman scattering LIDAR equation based on response signals detected by said fourth photodetection unit.

16. The lidar system for meteorological observation according to claim 12, wherein said analysis unit corrects said response signals based on noise data collected in advance.

17. A meteorological observation method using a LIDAR system for meteorological observation in which pulsed laser light having a prescribed central frequency is emitted from a laser device and reflected light thereof is observed, comprising the steps of:
- spectrally analyzing the reflected light for observation into light in the wavelength region of said laser light and light in wavelength regions other than the wavelength region of the laser light using a spectral analyzer;
- selectively extracting and detecting, using a first filter, light centered on a first frequency component among the light in the wavelength region of the laser light which has been spectrally analyzed by the spectral analyzer;
- selectively extracting and detecting, using a second filter, light centered on a second frequency component among the light in the wavelength region of the laser light which has been spectrally analyzed by the spectral analyzer;
- detecting light in the wavelength region of the laser light which has been spectrally analyzed by the spectral analyzer; and,
- detecting light in wavelength regions other than the wavelength region of the laser light which has been spectrally analyzed by the spectral analyzer.

* * * * *